(12) United States Patent
Mangan et al.

(10) Patent No.: US 12,711,664 B2
(45) Date of Patent: Aug. 18, 2026

(54) TRANSFORMATION OF COLOR REPRESENTATIONS AND SPECTRAL RECOVERY

(71) Applicant: VOYAGE81 LTD., Tel Aviv (IL)

(72) Inventors: Shmuel Mangan, Nes Ziona (IL); Boaz Arad, Beer Sheva (IL); Nimrod Morag, Hod Hasharon (IL); Hilit Unger, Even Yehuda (IL)

(73) Assignee: VOYAGE81 LTD., Tel Aviv (IL)

( * ) Notice: Subject to any disclaimer, the term of this patent is extended or adjusted under 35 U.S.C. 154(b) by 315 days.

(21) Appl. No.: 18/568,257

(22) PCT Filed: Jun. 7, 2022

(86) PCT No.: PCT/IL2022/050606
§ 371 (c)(1),
(2) Date: Dec. 7, 2023

(87) PCT Pub. No.: WO2022/259248
PCT Pub. Date: Dec. 15, 2022

(65) Prior Publication Data

US 2024/0289989 A1 Aug. 29, 2024

Related U.S. Application Data

(60) Provisional application No. 63/208,321, filed on Jun. 8, 2021.

(51) Int. Cl.
*G06T 7/90* (2017.01)
*G06T 3/20* (2006.01)

(52) U.S. Cl.
CPC .................. *G06T 7/90* (2017.01); *G06T 3/20* (2013.01); *G06T 2207/10024* (2013.01);
(Continued)

(58) Field of Classification Search
CPC ... G06T 7/90; G06T 3/20; G06T 2207/10024; G06T 2207/20048; G06T 2207/20081; G06T 2207/20084; G01J 3/28
(Continued)

(56) References Cited

U.S. PATENT DOCUMENTS 9,472,162 B2 * 10/2016 Stauder .................... G09G 5/02
11,085,823 B2 8/2021 Ben-Shahar
(Continued)

FOREIGN PATENT DOCUMENTS

CN 103247034 B 8/2013
CN 104063857 B 9/2014
(Continued)

OTHER PUBLICATIONS

Kim, Taehoon, et al., "Nonspectroscopic imaging for quantitative chlorophyll sensing"; Journal of biomedical optics, 21.1: 016008, Jan. 2016. DOI: 10.1117/1.JBO.21.1.016008.
(Continued)

*Primary Examiner* — Ali Bayat
(74) *Attorney, Agent, or Firm* — The Roy Gross Law Firm, LLC; Roy D. Gross

(57) ABSTRACT

A system comprising at least one hardware processor; and a non-transitory computer-readable storage medium having stored thereon program instructions, the program instructions executable by the at least one hardware processor to: receive a set of spectral datapoints obtained from a plurality of images of natural scenes, wherein the images are captured using a hyperspectral imaging device, perform data sampling to obtain a subset of the set of spectral datapoints that is representative of naturally-occurring spectral samples, and said subset of datapoints over (i) a known spectral response profile of a source color space, and (ii) a known spectral response profile of a target color space, to obtain
(Continued)

corresponding datasets of source spectral reference atoms and target spectral reference atoms.

14 Claims, 8 Drawing Sheets

(52) U.S. Cl.
CPC ............... *G06T 2207/20048* (2013.01); *G06T 2207/20081* (2013.01); *G06T 2207/20084* (2013.01)

(58) Field of Classification Search
USPC .......................................................... 382/167
See application file for complete search history.

(56) References Cited

U.S. PATENT DOCUMENTS

| | | | | |
|---|---|---|---|---|
| 2007/0024529 | A1* | 2/2007 | Ben-David | G09G 3/3413 345/32 |
| 2007/0024930 | A1* | 2/2007 | Cai | H04N 1/46 358/509 |
| 2014/0072209 | A1 | 3/2014 | Brumby et al. | |
| 2016/0132748 | A1 | 5/2016 | Tillotson | |
| 2019/0195690 | A1* | 6/2019 | Ben-Shahar | H04N 23/11 |
| 2019/0220964 | A1* | 7/2019 | Mello | A01B 79/005 |
| 2020/0400826 | A1* | 12/2020 | Talbert | H04N 23/10 |
| 2021/0033589 | A1* | 2/2021 | Tufillaro | G01J 3/0289 |

FOREIGN PATENT DOCUMENTS

| | | | |
|---|---|---|---|
| CN | 104182978 | A | 12/2014 |
| JP | 2007329380 | A | 12/2007 |
| WO | 2016029276 | A1 | 3/2016 |
| WO | 2017066825 | A1 | 4/2017 |

OTHER PUBLICATIONS

Jarecke, Peter J., et al., "Aggregation of Hyperion hyperspectral spectral bands into Landsat-7 ETM+ spectral bands"; In: Proc. SPIE. 2002. p. 259-263. doi: 10.1109/IGARSS.2001.978175.

Liu, Bo, et al., "Simulation of EO-1 Hyperion data from ALI multispectral data based on the spectral reconstruction approach"; Sensors, 2009, 9.4: 3090-3108. doi:10.3390/s90403090.

Kwon, Hyeokhyen et al., "RGB-Guided Hyperspectral Image Upsampling", 2015 IEEE International Conference on Computer Vision (ICCV), IEEE, (Dec. 7, 2015), pp. 307-315.

Xing, Lin et al., "Spatial-spectral encoded compressive hyperspectral imaging", ACM Transactions On Graphics, ACM, NY, US, (Nov. 19, 2014), vol. 33, No. 6, pp. 1-11. https://doi.org/10.1145/2661229.2661262.

Aharon, M. et al., "K-SVD: An Algorithm for Designing Overcomplete Dictionaries for Sparse Representation", IEEE Transactions on Signal Processing, vol. 54, No. 11, pp. 4311-4322, Nov. 2006, doi: 10.1109/TSP.2006.881199.

Timofte, R. et al. "Anchored neighborhood regression for fast example-based superresolution," IEEE Int'l Conf. on Computer Vision (ICCV), Dec. 2013. pp. 1920-1927, doi: 10.1109/ICCV.2013.241.

Yang, J. et al., "Image super-resolution via sparse representation," IEEE Trans. Image Proc. 19(11):2861-2873 Nov. 2010. doi: 10.1109/TIP.2010.2050625.

Wu, Y. et al., "A study on spectral super-resolution of hyperspectral imagery based on redundant dictionary"; Information Engineering, v. 3, 2014. Available online: [https://www.airitilibrary.com/Article/Detail?DocID=P20150609004-201412-201507270022-201507270022-67-71].

Hardeberg, J.Y., "Filter Selection for Multispectral Color Image Acquisition," J. Imaging Sci. Technol. 2004, 48, 177-182.

Li, S.X. et al., "Optimal Sensitivity of Multispectral imaging system based on PCA," Opto Electron. Eng. 2006, 33, 127-132; Available online: [https://www.researchgate.netpublication/296261547_Optimal_sensitivity_of_multispectral_camera_based_on_PCA].

Vora, P.L. and Trussell, H.J., "Measure of goodness of a set of colorscanning filters," J. Opt. Soc. Am. A, vol. 10, No. 7, 1499-1503, Jul. 1993. Available online: [https://opg.optica.org/josaa/abstract.cfm?uri=josaa-10-7-1499].

Imai, F.H. et al., "Digital camera filter design for colorimetric and spectral accuracy," Proc. Third Int'l Conference on Multispectral Color Science, Joensuu, Finland, Jul. 18-20, 2001, pp. 23-26.

NG, D-Y. and Allebach, J.P., "A subspace matching color filter design methodology for a multispectral imaging system," IEEE Trans. Image Process 2006, vol. 15, 2631-2643, Sep. 9, 2006. doi: 10.1109/TIP.2006.877384.

Quan, S. et al., "Optimization of camera spectral sensitivities," Proc. Color and Imaging Conf., Society for Imaging Sci. and Tech., Springfield, VA, 2000, pp. 273-278; Available online: [https://library.imaging.org > ist > cic > art00050].

B. Arad and O. Ben-Shahar. "Sparse Recovery of Hyperspectral Signal from Natural RGB Images"; European Conference on Computer Vision, pp. 19-34, 2016. DOI: 10.1007/978-3-319-46478-7 2.

X. Cao, X. Tong, Q. Dai, and S. Lin. "High Resolution Multispectral Video Capture with a Hybrid Camera System"; In CVPR, 2011.

H. Du, X. Tong, X. Cao, and S. Lin. "A prism-based system for multispectral video acquisition"; 2009 IEEE 12th International Conference on Computer Vision, Kyoto, Japan, 2009, pp. 175-182, doi: 10.1109/ICCV.2009.5459162.

M. Goel et al., "HyperCam: hyperspectral imaging for ubiquitous computing applications"; UbiComp '15: Proceedings of the 2015 ACM International Joint Conference on Pervasive and Ubiquitous Computing, Sep. 2015 pp. 145-156, May 9, 2005. http://dx.doi.org/10.1145/2750858.2804282.

R. Kawakami et al., "High-resolution hyperspectral imaging via matrix factorization CVPR"; IEEE Conference on Computer Vision and Pattern Recognition 2011. pp. 2329-2336, doi: 10.1109/CVPR.2011.5995457.

R. M. H. Nguyen, D. K. Prasad, and M. S. Brown. "Training based spectral reconstruction from a single RGB image"; In ECCV, vol. 8695 LNCS, pp. 186-201. Springer International Publishing, 2014; https://doi.org/10.1007/978-3-319-10584-0_13.

S.W. Oh et al., "Do It Yourself Hyperspectral Imaging with Everyday Digital Cameras"; 2016 IEEE Conf. Comput. Vis. Pattern Recognit., pp. 2461-2469, 2016. Available online: [https://openaccess.thecvf.com/content_cvpr_2016/ papers/Oh_Do_It_Yourself_CVPR_2016_paper.pdf].

J. I. Park et al., "Multispectral imaging using multiplexed illumination"; IEEE 11th International Conference on Computer Vision, ICCV, Rio de Janeiro, Brazil, 2007, pp. 1-8, doi: 10.1109/ICCV.2007.4409090.

M. Parmar, S. Lansel, and B. A. Wandell. "Spatio-spectral reconstruction of the multispectral datacube using sparse recovery"; 15th IEEE International Conference on Image Processing, San Diego, CA, USA, 2008, pp. 473-476, doi: 10.1109/ICIP.2008.4711794.

Fletcher-Holmes, D., Harvey, A.: "Real-time imaging with a hyperspectral fovea"; Journal of Optics A: Pure and Applied Optics, 7(6):298-302 (2005). DOI 10.1088/1464-4258/7/6/007.

Wang, T., Zhu, Z., Rhody, H.: "A smart sensor with hyperspectral/range fovea and panoramic peripheral view"; In: CVPR. IEEE Computer Society Conference on Computer Vision and Pattern Recognition Workshops (2009). doi: 10.1109/CVPRW.2009.5204095.

Cohen, J. "Dependency of the spectral reflectance curves of the Munsell color chips." Psychonomic Science 1 (1964): 369-370. https://doi.org/10.3758/BF03342963.

Maloney, L.T: "Evaluation of linear models of surface spectral re ectance with small numbers of parameters"; J Opt Soc Am A. Oct. 1986; 3(10):1673-83. DOI: 10.1364/josaa.3.001673.

Parkkinen, J.P et al., "Characteristic spectra of Munsell colors"; Journal of the Optical Society of America A; vol. 6, Issue 2, pp. 318-322, 1989.. DOI:10.1364/JOSAA.6.000318.

(56) References Cited

OTHER PUBLICATIONS

Hardeberg, J.Y.: "On the spectral dimensionality of object colors"; IEuropean conference on colour in graphics, imaging, and vision, 480-485, 2002. DOI:10.2352/CGIV.2002.1.1.art00101.
Adams, J.B. et al., "Simple models for complex natural surfaces: A strategy for the hyperspectral era of remote sensing"; 12th Canadian Symposium on Remote Sensing Geoscience and Remote Sensing Symposium, (1989). Vancouver, BC, Canada, 1989, pp. 16-21, doi: 10.1109/IGARSS.1989.567138.
Heikkinen, V. et al., "Evaluation and unification of some methods for estimating reflectance spectra from rgb images"; Journal of the Optical Society of America A; vol. 25, Issue 10, pp. 2444-2458, Oct. 2008. DOI: 10.1364/josaa.25.002444.
Lopez-Alvarez, M.A. et al., "Using a trichromatic ccd camera for spectral skylight estimation"; Applied optics 47(34):H31-8 (2008). DOI: 10.1364/ao.47.000h31.
Ayala, F. et al., "Use of three tristimulus values from surface reflectance spectra to calculate the principal components for reconstructing these spectra by using only three eigenvectors"; Journal of the Optical Society of America A; 23(8):2020-6, (2006). DOI: 10.1364/josaa.23.002020.
Xing, Z. et al, "Dictionary learning for noisy and incomplete hyperspectral images"; SIAM Journal on Imaging Sciences; 5(1), 33-56 (2012). https://doi.org/10.1137/110837486.
Takatani et al., "One-shot Hyperspectral Imaging using Faced Reflectors"; In Proceedings of the Conference on Computer Vision and Pattern Recognition, Honolulu, HI, USA, Jul. 21-26, 2017; pp. 4039-4047. Available online: [https://openaccess.thecvf.com/content_cvpr_2017/papers/Takatani_One- Shot_Hyperspectral_Imaging_CVPR_2017_paper.pdf].
Pati, Y. et al., "Orthogonal matching pursuit: Recursive function approximation with applications to wavelet decomposition"; In: The Twenty-Seventh Asilomar Conference on Signals, Systems and Computers., vol. 1, pp. 40-44 (1993). pp. 40-44 vol.1, doi: 10.1109/ACSSC.1993.342465.
Jiang, J. et al., "What is the space of spectral sensitivity functions for digital color cameras"; In: WACV, IEEE Workshop on Applications of Computer Vision (WACV), Clearwater Beach, FL, USA, 2013, pp. 168-179, doi: 10.1109/WACV.2013.6475015.
Akhtar et al., "Hyperspectral recovery from RGB images using Gaussian Processes"; Online at: https://arxiv.org/pdf/1801.04654.pdf, Jul. 20, 2018.
PCT International Search Report for International Application No. PCT/IL2022/050606, mailed Oct. 6, 2022, 3pp.
PCT Written Opinion for International Application No. PCT/IL2022/050606, mailed Oct. 6, 2022, 7pp.
PCT International Preliminary Report on Patentability for International Application No. PCT/IL2022/050606, issued Nov. 21, 2023, 8pp.

* cited by examiner

TRANSFORMATION OF COLOR REPRESENTATIONS AND SPECTRAL RECOVERY

CROSS-REFERENCE TO RELATED APPLICATIONS

This application is a National Phase of PCT Patent Application No. PCT/IL2022/050606 having an International filing date of Jun. 7, 2022, which claims priority from U.S. Application Ser. No. 63/208,321, filed Jun. 8, 2021, the contents of which are hereby incorporated herein in their entirety by reference.

FIELD OF THE INVENTION

The invention relates to the field of digital imaging.

BACKGROUND

Electronic image sensors used for most common imaging purposes rely on measuring electrons produced by the photoelectric effect. An inherent limitation of measuring light in this manner is that chrominance information is lost. Each measured photoelectron indicates only that a photon was absorbed, wherein current electronic photodetectors have no intrinsic process by which to discriminate the wavelength of the absorbed photons, and therefore regards them all as the same. Thus, the basic electronic image sensor is inherently monochromatic.

The most common method of color detection in image sensors is the color filter array (CFA), in which a pattern of color filters is overlaid on the image sensor, with a different type of color filter for each individual photodetector. In this way, each photodetector element will only measure light intensity for wavelengths within the passband of the filter. By employing three different types of color filters, an image sensor is able to record intensities at three ranges of wavelengths, which can serve as intensities for three primary colors that together produce a gamut representing many of the colors in the human visible spectrum, for example, the red, green, and blue (RGB) wavelengths, or the cyan, yellow, and magenta (CYM) wavelengths.

In contrast, a hyperspectral image comprises values for many more wavelengths. Thus, hyperspectral images provide fine-grained spectral data that can be useful in many applications. However, creating hyperspectral images requires using hyperspectral cameras. Unlike a conventional color camera which typically applies three filter colors to each pixel, a hyperspectral camera may use dozens of filter colors, or a diffraction grating at each image location to scatter light of different colors onto dozens of separate elements of an image sensor. Thus, although hyperspectral images offer many advantages, capturing them requires special hyperspectral cameras, which are typically heavier, bulkier, and expensive.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive a set of spectral datapoints obtained from a plurality of images of natural scenes, wherein the images are captured using a hyperspectral imaging device, perform data sampling to obtain a subset of said set of spectral datapoints that is representative of naturally-occurring spectral samples, and project said subset of datapoints over (i) a known spectral response profile of a source color space, and (ii) a known spectral response profile of a target color space, to obtain corresponding datasets of source spectral reference atoms and target spectral reference atoms.

There is also provided, in an embodiment, a computer-implemented method comprising: receiving a set of spectral datapoints obtained from a plurality of images of natural scenes, wherein the images are captured using a hyperspectral imaging device; performing data sampling to obtain a subset of the set of spectral datapoints that is representative of naturally-occurring spectral samples; and projecting said subset of datapoints over (i) a known spectral response profile of a source color space, and (ii) a known spectral response profile of a target color space, to obtain corresponding datasets of source spectral reference atoms and target spectral reference atoms.

There is further provided, in an embodiment, a computer program product comprising a non-transitory computer-readable storage medium having program instructions embodied therewith, the program instructions executable by at least one hardware processor to: receive a set of spectral datapoints obtained from a plurality of images of natural scenes, wherein the images are captured using a hyperspectral imaging device; perform data sampling to obtain a subset of the set of spectral datapoints that is representative of naturally-occurring spectral samples; and project said subset of datapoints over (i) a known spectral response profile of a source color space, and (ii) a known spectral response profile of a target color space, to obtain corresponding datasets of source spectral reference atoms and target spectral reference atoms.

In some embodiments, the program instructions are further executable to receive, and the method further comprises receiving, a digital image in the source color space and, iteratively, for each pixel in the digital image: (i) identify the k nearest atoms in the source spectral reference dataset; (ii) calculate a transform from said k nearest atoms in said source spectral reference dataset to a corresponding set of k atoms in the target spectral reference dataset; and (iii) apply the calculated transform to the pixel, to obtain a target pixel in the target color space.

In some embodiments, the program instructions are further executable to construct, and the method further comprises constructing, a target image in the target color space from all of the obtained target pixels in the target color space.

In some embodiments, the program instructions are further executable to, and the method further comprises, for each point in the source color space: (i) identify the k nearest atoms in the source spectral reference dataset; and (ii) calculate and store a transform from each of the k nearest atoms in the source spectral reference dataset to each of the corresponding atoms in the target spectral reference dataset.

In some embodiments, the program instructions are further executable to receive, and the method further comprises receiving, a digital image in the source color space and, iteratively, for each pixel in the digital image: (i) recall the stored transform calculated with respect to the point in the source color space which represents the pixel; and (ii) apply the recalled transform to the pixel, to obtain a target pixel in the target color space.

In some embodiments, the program instructions are further executable to construct, and the method further comprises constructing, a target image in the target color space from all of the obtained target pixels in the target color space.

In some embodiments, the transform is a linear transform which maps values between the source color space and the target color space.

In some embodiments, the transform is calculated as a weighted interpolation, by applying a weighting to each of the of the k nearest atoms in the source spectral reference dataset which is the inverse of its distance to a point in the source color space representing the pixel.

In some embodiments, the source color space is cyan-yellow-magenta (CYM), and the target color space is red-green-blue (RGB).

In some embodiments, the natural scenes comprise one or more of indoors scenes, outdoors scenes, cityscape scenes, countryside scenes, landscape scenes, landforms scenes, terrain scenes, wildlife scenes, vegetation scenes, and objects scenes.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
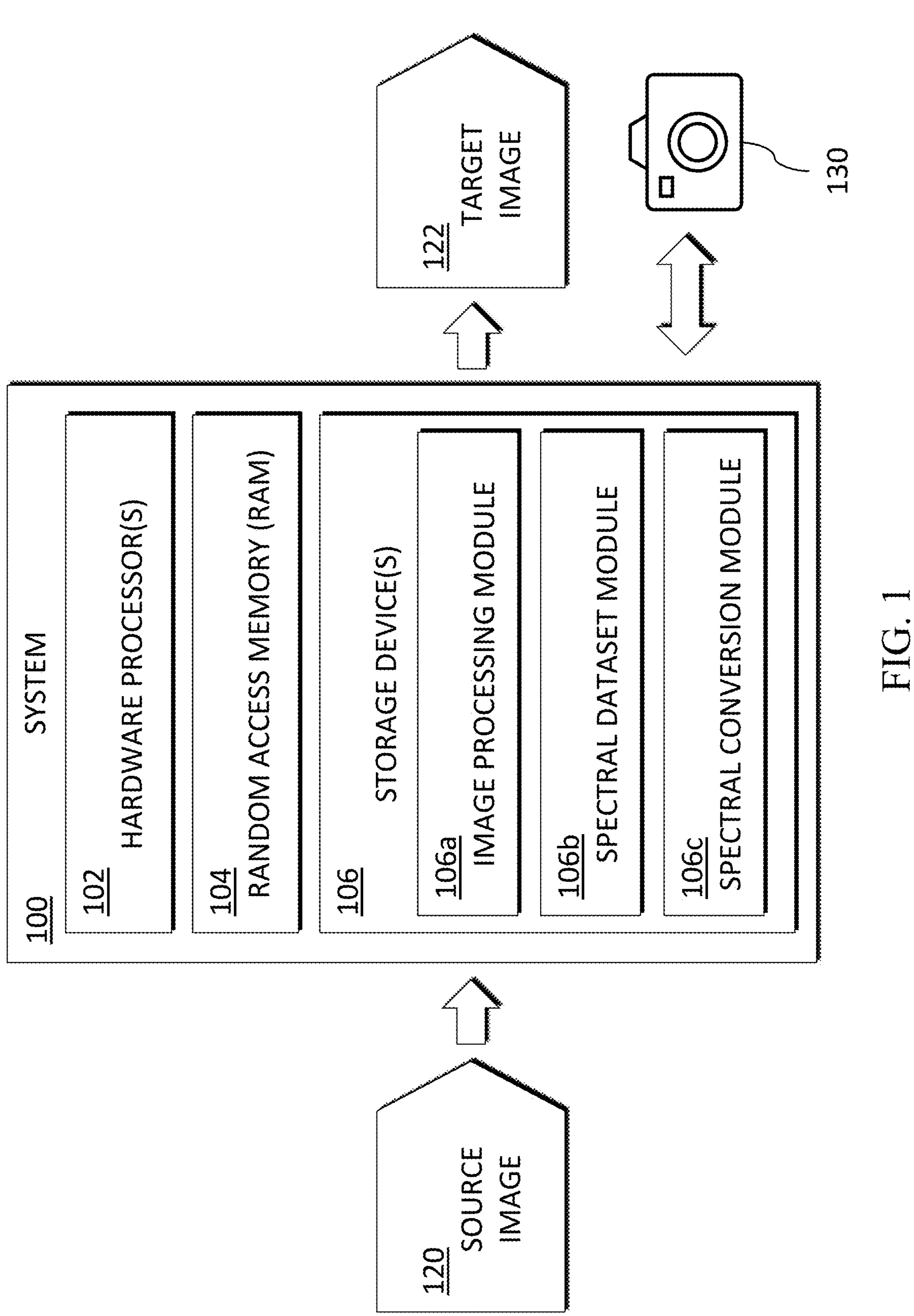
FIG. 1 shows a block diagram of an exemplary system for conversion or transformation of digital image data between any two color representations, color models, or color spaces used in digital imaging, and/or for recovery or reconstruction of spectral image data from digital image data with low spectral resolution, according to some embodiments of the present technique.

Disclosed herein is a technique, embodied in a system, computer-implemented method, and computer program product, for accurate and efficient conversion or transformation of digital image data between any two color representations, color models, or color spaces, used in digital imaging. In some embodiments, the present technique provides for recovery or reconstruction of spectral image data, e.g., hyperspectral image data, from image data acquired using a non-hyperspectral imaging modality.

By way of background, image sensors, such as found in common imaging devices, comprise an array of photodetectors which enable detection of light intensity at each location over the imaging area. The image sensor converts incoming light (photons) into a signal from which the light information can be derived. The response spectra for a typical silicon-based image sensor (the most common for imaging applications in the human-visible spectrum) spans approximately from 400 nm to 1100 nm, encompassing the human-visible 400-700 nm spectrum as well as part of the near-infrared spectrum.

However, basic photodetectors are only able to detect luminance information, and not chrominance information—the color information of the photon encoded in its wavelength, or energy. Thus, electronic image sensors simply count the number of accumulated electrons, irrespective of their energy, such that the chrominance information is lost. This renders the electronic image sensor inherently monochromatic—it measures the intensity of light over a single wavelength range encompassing the visible spectrum, and is unable to derive anything about the spectral distribution of the input light within it.

Although electronic image sensors are inherently monochromatic, the human vision system is obviously not. Photosensitive cells in the retina of the eye convert incoming photons into neural signals, which collectively can be interpreted and rendered into an image. For purposes of color perception, the human eye has cone cells, each sensitive to only a portion of the visible spectrum. Cone cells are classified into one of three types, corresponding to the portion of the spectrum they are sensitive to:

Long-wavelength L cones having peak sensitivity at 564-580 nm wavelengths.

Medium-wavelength M cones having peak sensitivity at 534-545 nm).

Short-wavelength S cones having peak sensitivity at 420-440 nm).

Collectively, these three types of cone cells detect intensity at three different portions of the visible spectrum, and this information can be used to derive a single color representative of the spectral distribution of the input light. Humans are thus classified as 'trichromats'—all color information we see is derived from measuring the relative intensities of light in the three wavelength ranges detected by L, M, and S cones.

Because humans employ a trichromatic vision system, display media of images intended for human viewing need not emit or reflect the exact spectrum of light matching that of the original scene, but simply a combination of intensities in three separate wavelength regions, such that the stimulus to the three cone types remain the same. Thus, for electronic image sensors designed to reproduce images of a scene for human vision, color detection need only go so far as categorizing incoming light into one of three wavelength ranges (primary colors), rather than measuring the exact wavelength of each incoming photon.

The most common method of color detection in image sensors, the color filter array (CFA), comprises a pattern of color filters that is overlaid on the image sensor, with a different type of color filter for each individual photodetector. In this way, each photodetector only measures light intensity for wavelengths within the passband of the filter. By employing three different types of color filters, an image sensor is able to record intensities at three ranges of wavelengths, which can serve as intensities for three primary colors that together produce a gamut representing many of the colors in the human visible spectrum.

Drawbacks of CFAs include the fact that, with a color filter placed over each photodetector, no pixel location receives the total amount or complete wavelength range of input light. In addition, because the color filters placed over each photodetector are designed to only allow a small wavelength range of light through, any input light outside the passband of the filter is essentially wasted—this light is absorbed or reflected by the filter, and its intensity is never recorded by the sensor.

The most common digital color camera is based on RGB color sensors. Each of the RGB colors sensors has a spectral response that is close, but not identical, to the human perceptual RGB color responses. In order to reproduce the correct perceptual colors from the camera RGB colors, the common practice is to use a simple linear conversion, based on the assumption that the imaging sensor response profile is sufficiently close to the human perceptual color space. The linear color correction involves multiplying by a color correction matrix (CCM), which is learned using a standard set of color samples on a standard color chart (e.g., the Macbeth Babel color chart).

RGB filter arrays represent disadvantages related to light collection efficiency. For example, CYM filter arrays have as much as 50~100% greater light collection efficiency. This occurs because subtractive filter dyes display a reduced absorption of light waves in the visible region when compared to the corresponding additive filters. In contrast to the red, green, and blue filters, which are composites of two or more layers producing additive absorption, CYM filters are applied in a single layer that has superior light transmission characteristics.

Thus, using a CYM imaging sensor may lead to better signal-to-noise ratio (SNR), as well as better low light imaging quality, as compared to RGB. However, converting CYM image data to the RGB space is not straightforward. Thus, when a non-RGB imaging sensor is used for image acquisition, color reproduction using the usual linear correction matrix is inadequate for most common uses and more complex color correction methods are required. Oftentimes, these algorithms result in the production of additional noise during color conversion.

Accordingly, in some embodiments, the present technique provides for transforming or converting profiled color information, e.g., from a source color response profile (e.g., of an imaging device, such as a phone camera) to a target color response profile (e.g., of a target output device, such as a display or a printer) by using a spectral reference dataset comprising 'ground-truth' spectral samples which cover the many possible naturally-occurring colors that humans can perceive.

In some embodiments, the present technique provides for constructing a representative spectral reference dataset of naturally-occurring hyperspectral color samples, termed 'spectral atoms.' In some embodiments, the spectral reference dataset of the present technique may comprise a set of spectral atoms obtained from a plurality of spectral images depicting natural scenes, e.g., any indoors, outdoors, cityscape, countryside, landscape, landforms, terrain, wildlife, vegetation, objects, and/or other like scenes. In some embodiments, a spectral reference dataset of the present technique may be a sparse spectral reference dataset comprising only a subset of spectral atoms selected to represent the gamut of naturally-occurring hyperspectral color responses with minimal redundancy.

For example, in some embodiments, the present technique provides for conversion or transformation of digital image data in a source color space or representation, such as the cyan-yellow-magenta (CYM) color space (also referred to as CYMK), into a target color space, e.g., red-green-blue (RGB) color space. In such example, a digital image may be captured in the CYM color space, using an imaging sensor comprising a color filter array (CFA) based on the primary subtractive colors of the CYM color space: cyan-yellow-magenta. By way of background, a potential motivation for using a CYM-based imaging device is that a CYM filter array provides increased imaging sensitivity as compared to an RGB filter array, resulting in improved light transmission through the filter and a stronger signal with less noise. However, an image acquired using a CYM filter array may need to be converted to RGB to allow rendering on common display devices, such as televisions, computer monitors, smartphone display, etc.

Accordingly, the present technique provides for a conversion or transformation between a source and target color representations (e.g., CYM to RGB), in a way which preserves the advantages of the source CYM image (e.g., superior light transmission and signal-to-noise ratio) in the resulting target RGB rendering. The present technique thus results in an enhanced target RGB rendering as compared to an equivalent image acquired using RGB equipment in the first place.

In some embodiments, the source and target color spaces may each comprise a set of spectral bands that are at least partially overlapping. In some embodiments, the source and target color spaces may each comprise different spectral bands. In some embodiments, the source color space may comprise a set of spectral bands included in the target color space, or vice-versa. In some embodiments, the source and target color spaces may each comprise a different number of spectral bands. Thus, for example, a target color space may comprise additional and/or different spectral bands as compared to the source color space. In some embodiments, the present technique thus enables recovery or reconstruction of spectral information in spectral bands not present in the source color space.

In some embodiments, the spectral reference dataset of spectral atoms or the present technique may be used to accurately convert or transform digital image data provided in a source color representation, such CYM, into a target color space, e.g., RGB. For example, the present technique provides for using the spectral reference dataset of spectral atoms to generate an ideal response of a source imaging device (e.g., a phone camera) in a source color space (e.g., CYM). This is accomplished by identifying, for each pixel in a source image, nearest corresponding one or more spectral atoms in the spectral reference dataset. The identified spectral atoms may then be projected over the known spectral response of the imaging device, to create a set of 'source spectral atoms' representing optimal color responses in the source color space.

In the context of the present technique, the term "project" or "projecting" term means applying a selected spectral response curve (e.g., one that is associated with a specific imaging sensor) to a spectral cube comprising spectral irradiance values, to simulate the appearance of an image acquired using an imaging device having the selected response curve.

Then, the present technique uses the spectral reference dataset of spectral atoms to generate a response of a given target device (e.g., a display monitor) in a target color space (e.g., RGB), by identifying a nearest one or more of the spectral atoms in the spectral reference dataset with respect to each display pixel in the target device, and projecting each of the identified spectral atoms over the known spectral response of the target device, to create a set of 'target spectral atoms' representing optimal color responses in the source color space. In some embodiments, the target color space may represent an 'ideal human observer' perceptual space, a standard CIE color space, or one of the industry standard color spaces, such as sRGB rec2040, etc. In some embodiments, the target color space comprises additional and/or other spectral bands with respect to the source color space, wherein the present technique thus enables recovery or reconstruction of spectral information from a source image in a specified color space.

In some embodiments, the present technique then provides for calculating conversion parameters or transforms between the 'source' and 'target' spectral atoms. In some embodiments, the present technique then provides for converting the source image data, at the source color space, to accurate perceptual colors at a target color space, using the calculated conversion parameters or transforms. Thus, for example, during reconstruction of an image captured by any imaging device, such as a conventional digital camera, the present technique identifies, for each pixel, a nearest one or more spectral atoms, and then uses the calculated conversion parameters of these identified spectral atoms to compute the correct color in the target color space.

A potential advantage of the present technique is, therefore, in that it provides for fast and accurate conversion between color spaces based on a learned spectral reference dataset of naturally-occurring spectral samples. The present technique thus allows to increase quantum efficiency by using imaging sensors with color response profiles optimized for light collection, and then accurately converting the acquired image data into any desired target color space for display or other purposes. In addition, in some embodiments, the target color space comprises additional and/or other spectral bands with respect to the source color space. Thus, the present technique may be used to recover detailed spectral data in digital image data acquired using a response profile with low spectral resolution. Advantageously, the spectral recovery yields a hyperspectral image which contains spectral data not included in the originally-acquired digital image.

As used herein, 'spectral band' means a range or a band of wavelengths in the electromagnetic spectrum. For example, a digital color image may contain data in three spectral bands—red, green and blue. A set of spectral bands means two or more discrete spectral bands. These discrete spectral bands may be immediately next to one another in the electromagnetic spectrum, partially overlap, or be farther apart from each other. An example of a set of spectral bands is the information contained in an RGB digital image, which, as mentioned above, includes data in three spectral bands-red, green and blue.

The term 'multispectral' means a digital image or a digital signal composed of data in multiple spectral bands.

The term 'hyperspectral' means a multispectral digital image or signal composed of a relatively large number of spectral bands, e.g., 16 or more. Such a digital image or signal contains information from across a relatively large range in the electromagnetic spectrum. Such range may contain spectral bands within the visible spectrum, or, in some cases, may extend beyond the visible spectrum. For example, a hyperspectral digital image or signal may include spectral bands in the visible, ultraviolet and infrared wavelength ranges.

The terms 'spectral response' or 'spectral sensitivity' may be used interchangeably to denote the relative efficiency of detection of light, e.g., by an imaging sensor, as a function of the frequency or wavelength of the signal.

The 'quantum efficiency' or 'photon efficiency' of an image sensor is defined as the percentage of photons hitting the device's photo-reactive surface which produces charge carriers. An image sensor with a high photon efficiency is more sensitive to light. In image sensor design, increasing photon efficiency is beneficial, as it increases the sensors capability to function in low-light conditions.

The terms 'color representation,' 'color space,' or 'color model' may be used interchangeably to denote a specific organization of colors which defines quantitative links between distributions of wavelengths and physiologically perceived colors in human color vision. Typical color spaces represent colors as tuples of numbers, typically as three or four values or color components. A color space may be used to define the color capabilities of a particular device or digital media.

The terms 'color space translation,' 'color space transformation,' 'or color space conversion' may be used herein interchangeably to denote the transformation of the representation of a color from one color space or representation to another. This calculation is required whenever data is exchanged inside a color-managed chain and carried out by a color matching module.

The term 'scene' may refer to any scene captured on a tangible medium using an imaging device. The term 'natural scene' may refer to any indoors, outdoors, cityscape, countryside, landscape, landforms, terrain, wildlife, vegetation, and/or similar views.

Reference is made to FIG. 1, which shows a block diagram of an exemplary system 100 for conversion or transformation of digital image data between any two color representations, color models, or color spaces used in digital imaging, and/or for recovery or reconstruction of spectral image data from digital image data with low spectral resolution, according to some embodiments of the present technique.

System 100 may include one or more hardware processor(s) 102, a random-access memory (RAM) 104, and one or more non-transitory computer-readable storage device(s) 106. Storage device(s) 106 may have stored thereon program instructions and/or components configured to operate hardware processor(s) 102. The program instructions may include one or more software modules, such as an image processing module 106*a*, spectral dataset module 106*b*, and/or a spectral conversion module 106*c*. The software components may include an operating system having various software components and/or drivers for controlling and managing general system tasks (e.g., memory management, storage device control, power management, etc.), and facilitating communication between various hardware and software components.

System 100 may operate by loading instructions of image processing module 106*a* and/or spectral conversion module 106*b* into RAM 104 as they are being executed by processor(s) 102.

In some embodiments, the instructions of image processing module 106*a* may cause system 100 to receive an input source image 120 in a source color representation, to convert it into a target color space, and to output it as target image 122. In some embodiments, the target image may be in a target color space which comprises additional and/or other spectral bands with respect to the source color space, wherein the present technique thus enables recovery or reconstruction of spectral information from a source image in a specified color space.

In some embodiments, image processing module 106*a* may be configured to receive digital image data and to apply thereto any one or more algorithms configured to perform any necessary and desired image processing tasks with respect to the received image data, using any suitable image processing methods and technique. As used herein, terms 'image,' 'image data,' and/or 'digital image' refer to any digital data capable of producing a visual representation, including digital images and digital video. Although much of the disclosure herein focuses on digital images, the present technique may be equally applied with regard to any type of digital visual media. For instance, in addition to digital images, the present technique may also apply with respect to multiple images/frames in a digital video. Depending on the embodiment, the image processing module 106*a* can also transmit and/or route image data through various processing functions, or to an output circuit that sends received and/or processed image data for further processing by one or more other modules of system 100; for presentation, e.g., on a display; to a recording system; across a network; or to any other logical destination. The image processing module 106*a* may apply any image processing algorithms alone or in combination. Image processing module 106*a* may also facilitate logging or recording operations with respect to any image data scan. In some embodiments, storage device 106 may be used for storing, retrieving, comparing, and/or annotating captured images.

In some embodiments, the instructions of spectral conversion module 106*b* may cause system 100 to apply any one or more mathematical operations and algorithms to numerical representations of digital image data, to facilitate any data sampling, dimensionality reduction, smoothing, normalizing, conversion, transformation, and/or any other similar operation. In some embodiments, spectral conversion module 106*b* may implement any one or more machine learning algorithms, e.g., any convolutional neural network (CNN), recurrent neural network (RNN), deep neural network (DNN), generative models, adversarial neural network (ANN), and/or any other machine learning algorithms which may be trained based on a minimization of a loss function.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Figure 2:
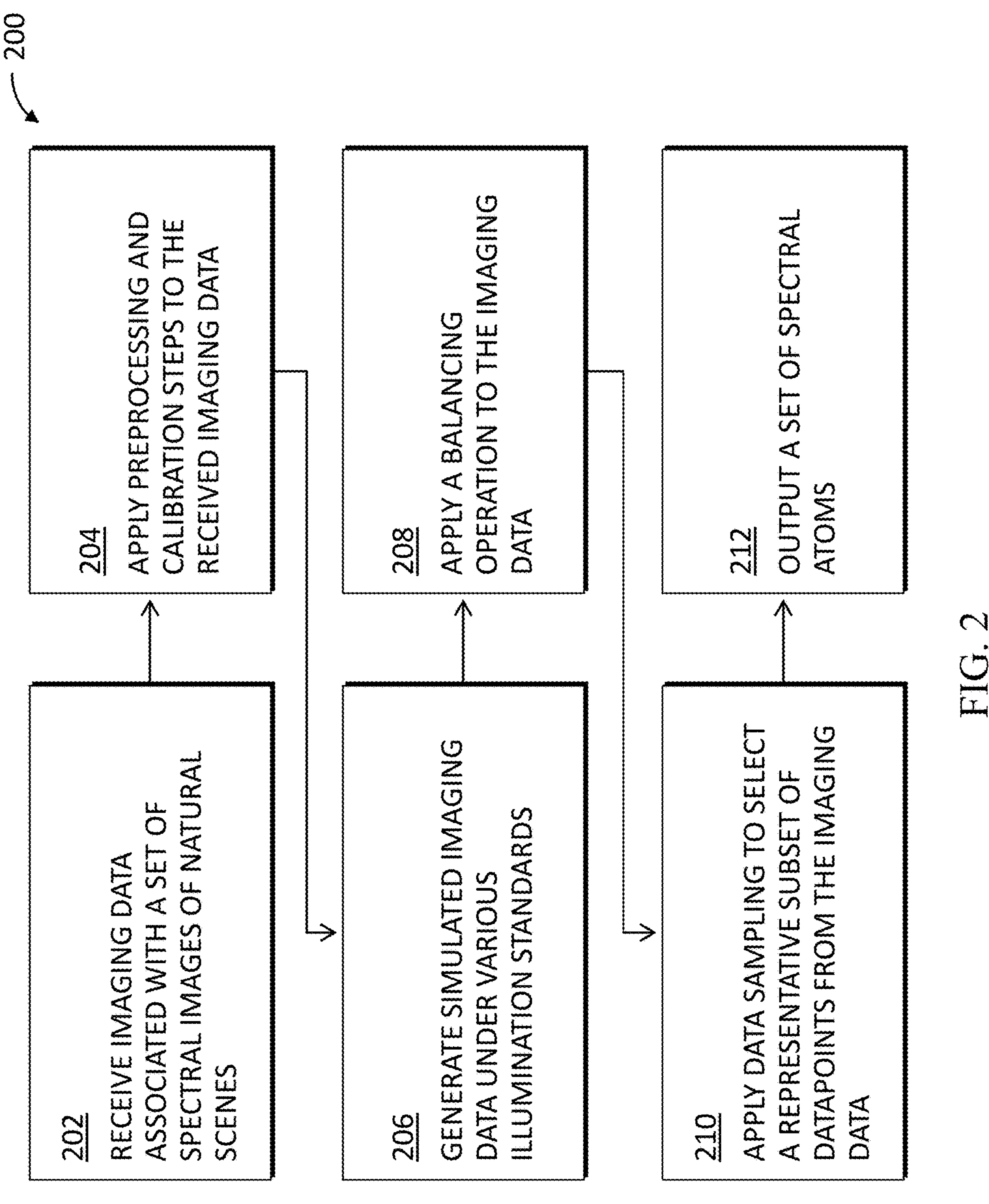
FIG. 2 is a flowchart which illustrate the functional steps in a method for constructing a representative spectral reference dataset of naturally-occurring hyperspectral color samples, termed 'spectral atoms,' according to some embodiments of the present technique.

The instructions of image processing module 106*a* and/or spectral conversion module 106*b* are now discussed with reference to the flowchart of FIG. 2, which illustrates the functional steps in a method 200 for constructing a representative spectral reference dataset of naturally-occurring hyperspectral color samples, termed 'spectral atoms.' In some embodiments, the spectral reference dataset of the present technique may comprise a set of spectral atoms obtained from a database of spectral images depicting natural scenes, e.g., any indoors, outdoors, cityscape, countryside, landscape, landforms, terrain, wildlife, vegetation, objects, and/or any like scenes.

The various steps of method 200 will be described with continuous reference to exemplary system 100 shown in FIG. 1. The various steps of method 200 may either be performed in the order they are presented or in a different order (or even in parallel), as long as the order allows for a necessary input to a certain step to be obtained from an output of an earlier step. In addition, the steps of method 200 may be performed automatically (e.g., by system 100 of FIG. 1), unless specifically stated otherwise. In addition, the steps of FIG. 2A are set forth for exemplary purposes, and it is expected that modification to the flow chart is normally required to accommodate various network configurations and network carrier business policies.

Method 200 begins in step 202, wherein the present technique provides for receiving, as input, a plurality of samples of naturally-occurring spectra, that will be used as 'ground truth' reference data.

Thus, for example, the instructions of system 100 may cause it to operate spectral imaging device 130 in FIG. 1, to capture a set of spectral images depicting natural scenes, e.g., any indoors, outdoors, cityscape, countryside, landscape, landforms, terrain, wildlife, vegetation, objects, and/or any like scenes. In some embodiments, the spectral images may be captured using any suitable spectral imaging device. For example, the spectral images may be captured using a 'push broom' type spectral camera, which is configured to capture an image of a scene from a narrow scanning slit in the camera line of sight, and to decompose the obtained irradiance from the scene in a direction perpendicular to the orientation of the slit. The scanning slit is moved in a scanning motion along an axis of imaging, to collect spatial data for the construction of a spectral cube. However, any other suitable spectral imaging device may be used in the context of the present technique.

In some embodiments, the present technique provides for placing a diffusive reflective reference target within the scene, e.g., a Spectralon board, to calibrate the illumination characteristics and white balance of the scene, and to provide for a "conversion factor" from irradiance to reflectance.

In some embodiments, in step 204, the instructions of image processing module 106*a* may cause system 100 to perform any one or more preprocessing and/or calibration operations may with respect to the spectral images captured at step 202. Thus, for example, the present technique provides for performing one or more of:

- Radiometric calibration with spatial correction, based on the technical specifications of the spectral imaging device;
- smoothing at the edge of the spectral range;
- rescaling of the captured data to bands with a resolution of 10 nm;
- normalizing the intensity of all pixels to same level (e.g., using an L1-Norm function); and/or
- converting irradiance data to reflectance values, based on the calibration using the reference target in the images.

In some embodiments, in step 206, the instructions of image processing module 106*a* may cause system 100 to process the spectral reflectance cubes obtained in step 204, to simulate different illumination sources. For example, step 206 may comprise simulating the reflectance cubes under illumination sources including, but not limited to, CIE illumination sources A (tungsten filament lighting), B (daylight simulations), E (equal energy radiator), D (natural daylight variations, e.g., D50, D55, D65, and/or D75) and/or F (fluorescent lighting).

Figure 3A:
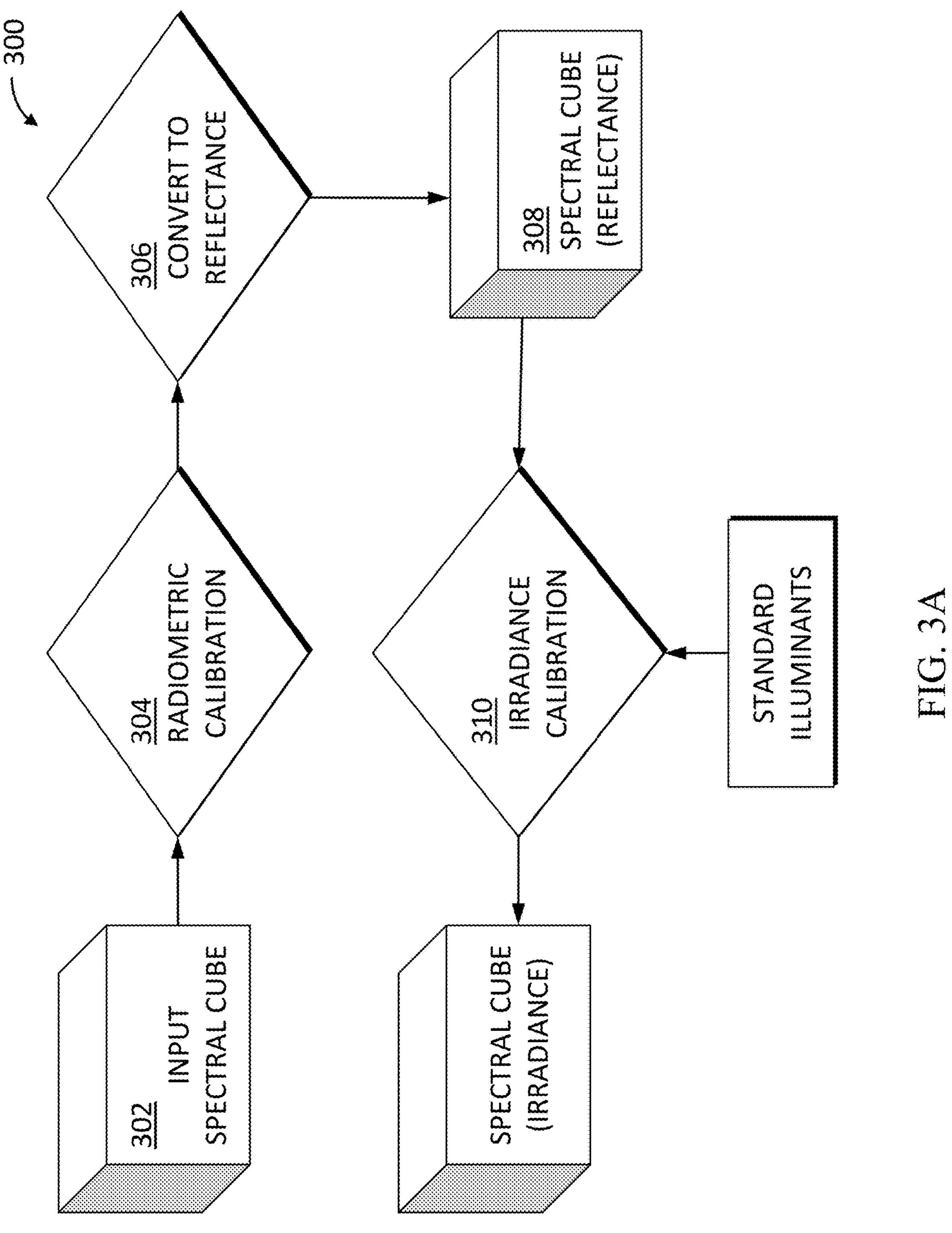
FIG. 3A is a schematic illustration of the various steps in the process for constructing a representative spectral reference dataset of naturally-occurring hyperspectral color samples, according to some embodiments of the present technique.

Reference is made to FIG. 3A, which is a schematic illustration of the functional steps in an exemplary method 300 for the preprocessing and calibration operations detailed in steps 204 and 206 of method 200.

As can be seen, in step 302, an input spectral cube is received from an imaging process using a spectral imaging device, such as imaging device 130 shown in FIG. 1.

In step 304, the instructions of image processing module 106*a* may cause system 100 to apply radiometric calibration with spatial correction to the raw numeric spectral pixel values, e.g., based on imaging device technical specifications.

In step 306, the instructions of image processing module 106*a* may cause system 100 to convert the radiometric data to reflectance based on a conversion factor form irradiance to reflectance, using a reference target within the scene, such as a reflective and diffusive target.

In step 308, the instructions of image processing module 106*a* may cause system 100 to output a spectral cube comprising reflectance values.

In step 310, the instructions of image processing module 106*a* may cause system 100 to convert the spectral reflectance cube to simulate different illumination irradiance cubes under different standard illuminants, such as CIE standards A, B, E, D50, D55, D65, D75, etc.

With reference back to FIG. 2, in some embodiments, the result of steps 202-206 is a collection comprising a set of spectral response datapoints associated with naturally-occurring scenes.

In some embodiments, in step 208, the instructions of spectral dataset module 106*b* may cause system 100 to apply a balancing process to the dataset, to produce a smaller balanced sparse dataset. In some embodiments, the balancing process comprises the following steps:

- Reducing the dimensionality of each spectral datapoint by dividing the spectra into bins of fixed width, using, e.g., a Gaussian binning technique. In some embodiments, the present technique provides for applying a gaussian filter for smoothing and down-sampling at, e.g., a 4:1 ratio, such that each datapoint may be reduced from 31 into 7 bins.
- Normalizing datapoints, e.g., using an L1-Norm or L2-Norm function, such that intensity information is removed and only color information is used.
- Reducing the number of dimensions, through rotation-projection process, because the normalization creates one less degree of freedom in the data.
- Dividing each dimension of the multidimensional hyperspace into small bins, through a linear, logarithmic or any other division.
- Sampling each bin to produce a small number of datapoints based on one of a few strategies:
  - One datapoint per bin.
  - Up to N samples per bin.
  - Variable number of samples, based on a given formula, such that highly populated bins will yield more samples.
  - Probability of selection per atom, e.g., in the MC space, may be given as input, e.g., using an earlier dilution process in a different space, e.g., HS space.
  - The probability of selection may depend on the density, based on a parametric power formula.
- Assigning to each datapoint a 'frequency' value that represents the frequency of samples in the original samples, represented by the chosen sample, using the number of samples in the bin or in its neighborhood.

In some embodiments, in step 210, the instructions of spectral dataset module 106*b* may cause system 100 to apply a data sampling stage to the balanced set of datapoints obtained in step 208, to select a subset of data points that are representative of naturally-occurring hyperspectral responses. In some embodiments, the datapoint subset comprises a smaller number of datapoint, which allow for reducing computational overhead and complexity, while retaining the representativeness of the set of naturally-occurring spectra in the natural world. In some embodiments, a subset of the present technique may comprise, e.g., any number between 25-25,000 datapoints, e.g., 50, 100, 150, 200, 500, 1000, 5000, 10,000, 15,000, 20,000, 25,000 datapoints.

In some embodiments, data sampling may be performed using, e.g., a sparse spectral reference dataset learning algorithm which aims to find a sparse representation of the input data. For example, a k-means clustering method may be used, such as a K-SVD spectral reference dataset learning algorithm.

In some embodiments, data sampling may comprise an iterative algorithm used to select a representative optimized subset from the set of data points. In such embodiments, a subset may be initialized with a random selection of, e.g., 1000-3000 datapoints. An iterative training process may then take place, wherein, in each iteration, a small sample of datapoints are replaced in the subset, and a set of metrics with respect to the newly-iterated subset is calculated. The calculated metrics may relate, at least in part, to spatial distribution of the datapoints in each iterated subset. The iterative process may continue until a measured improvement in the subset metrics falls below a specified threshold.

In some embodiments, data sampling may comprise defining a fixed grid on the source color space, and estimating a representative (average) datapoint in each grid point, based, at least in part, on a combination of datapoints within a specified distance therefrom. In some embodiments, the grid parameters may be defined as to grid density, minimum number of datapoints for grid point calculation, and/or datapoint collection radius relative to each grid point.

In some embodiments, any one or more other suitable techniques may be applied to perform data sampling.

In some embodiments, in step 212, the instructions of spectral dataset module 106*b* may cause system 100 to output a set of spectral atoms which may form the building blocks for a spectral reference dataset of spectral atoms. In some embodiments, the reference set of spectral atoms may be used to convert or transform digital imaging data obtained in a source color space into imaging data in a desired target color space.

Figure 3B:
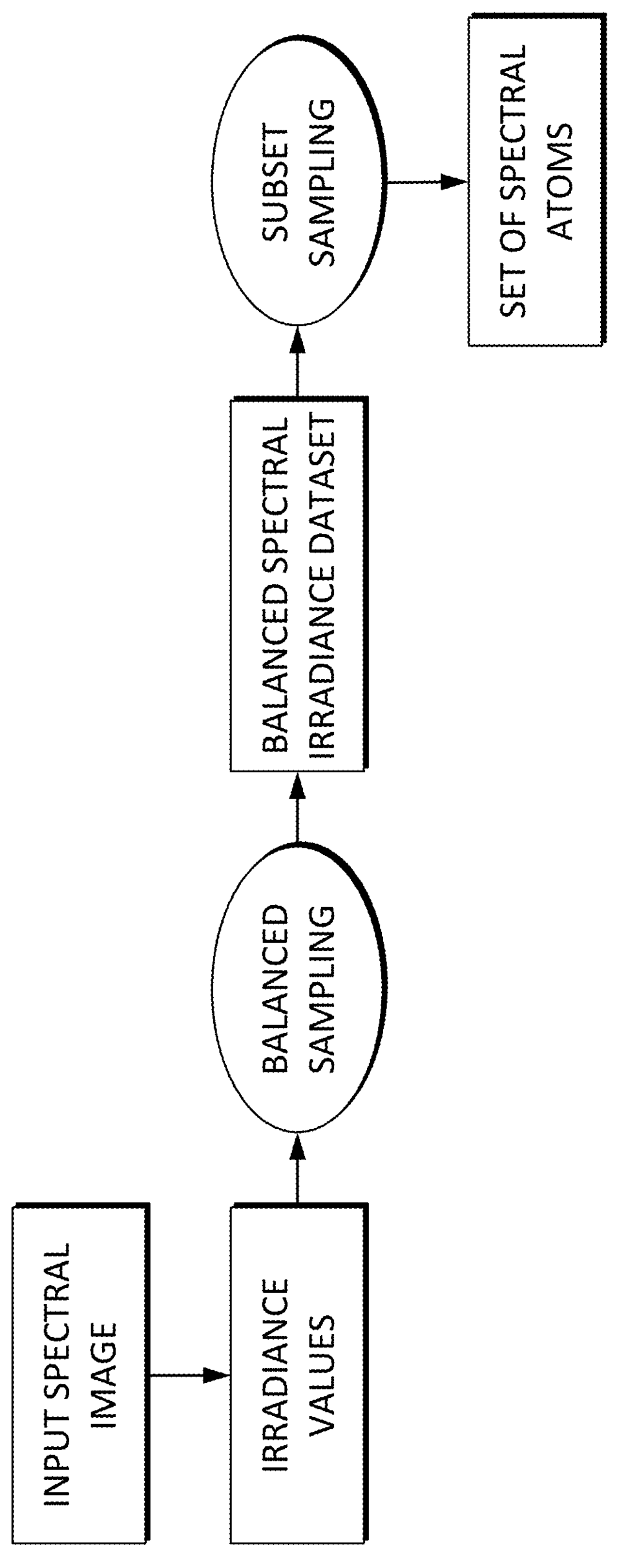
FIG. 3B is a schematic illustration of the preprocessing and calibration operations in a technique for conversion or transformation of digital image data between any two color representations, color models, or color spaces used in digital imaging, and/or for recovery or reconstruction of spectral image data from digital image data with low spectral resolution, according to some embodiments of the present technique.

FIG. 3B is a schematic illustration of the various steps in the process for constructing a representative spectral reference dataset of naturally-occurring hyperspectral color samples.

Figure 4:
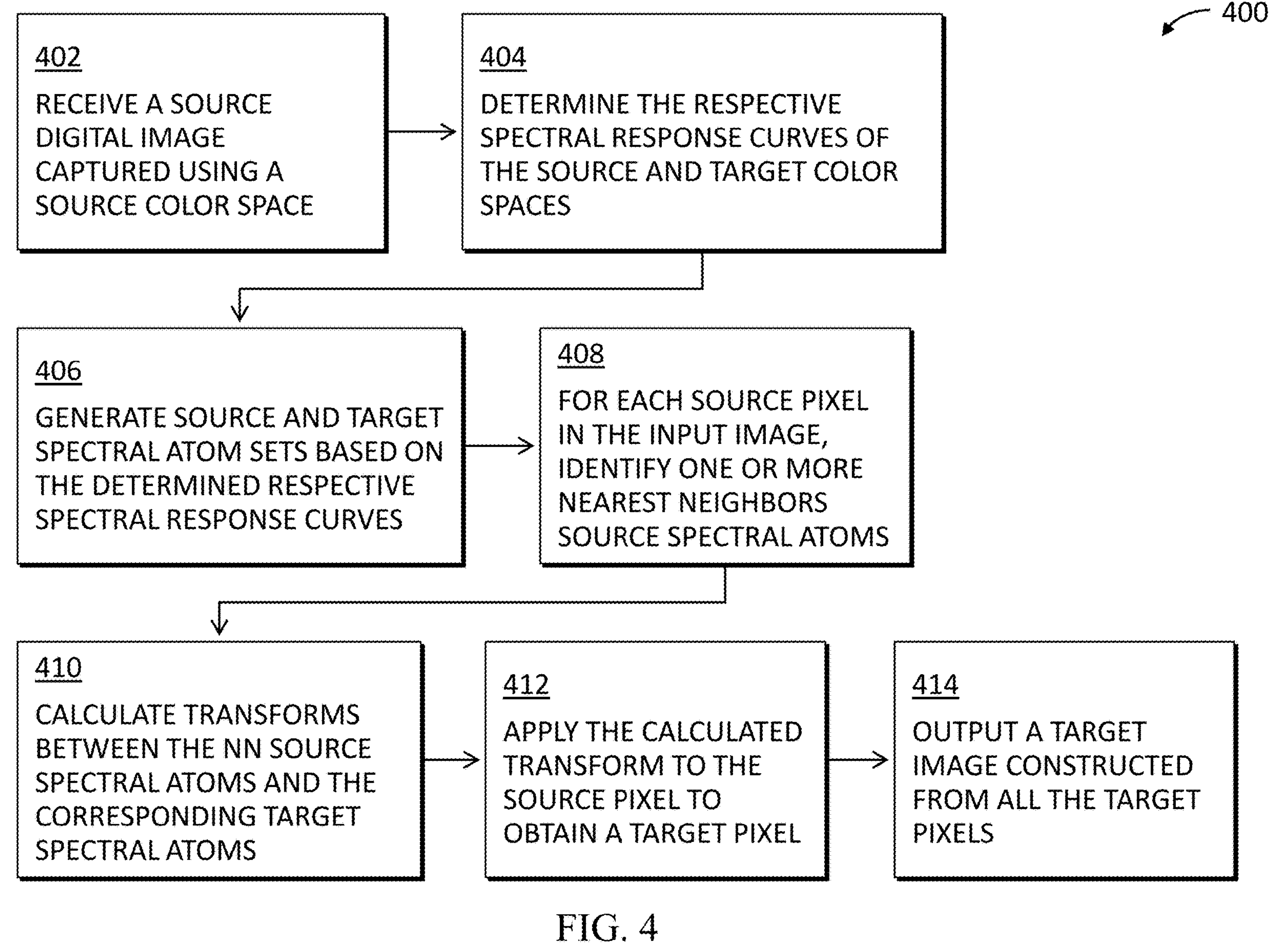
FIG. 4 is a flowchart which illustrate the functional steps in a method for conversion or transformation of digital image data between any two color representations, color models, or color spaces used in digital imaging, and/or for recovery or reconstruction of spectral image data from digital image data with low spectral resolution, according to some embodiments of the present technique.

The instructions of image processing module 106*a*, spectral dataset module 106*b* and/or spectral conversion module 106*c* are now discussed with reference to the flowchart of FIG. 4, which illustrates the functional steps in a method 400 for conversion or transformation of digital image data between a source and a target color spaces, and/or for recovery or reconstruction of spectral image data from digital image data with low spectral resolution, according to some embodiments of the present technique.

The various steps of method 400 will be described with continuous reference to exemplary system 100 shown in FIG. 1. The various steps of method 400 may either be performed in the order they are presented or in a different order (or even in parallel), as long as the order allows for a necessary input to a certain step to be obtained from an output of an earlier step. In addition, the steps of method 400 may be performed automatically (e.g., by system 100 of FIG. 1), unless specifically stated otherwise. In addition, the steps of FIG. 4 are set forth for exemplary purposes, and it is expected that modification to the flow chart is normally required to accommodate various network configurations and network carrier business policies.

In some embodiments, method 400 provides for converting digital image data in a source color space, captured using a source imaging device with a known or measured spectral response, into imaging data in a desired target color space, which may be associated with a target device (e.g., a display device). In some embodiments, a source color space may be defined as a color space of a source imaging device, e.g., a specified type and/or model of camera or any other device comprising an imaging sensor. In some embodiments, the target color space may represent an 'ideal human observer' perceptual space, a standard CIE color space, or a color space of a specified target device (e.g., a display or a printer), e.g., one of the industry standard color spaces, such as sRGB rec2040, etc. In some embodiments, the target color space comprises additional and/or other spectral bands with respect to the source color space, wherein the present technique thus enables recovery or reconstruction of spectral information from a source image in a specified color space.

Method 400 begins in step 402, in which the present technique provides for receiving an input source image 120 acquired in a source color space. For example, the source image may be acquired using a specific source device having a CYM-based imaging sensor.

In some embodiments, the instructions of image processing module 106*a* may cause system 100 to apply to the raw input source image 120 data one or more preprocessing steps, including, but not limited to:

- Color balancing or white balancing to apply a global adjustment of the intensities of the colors and to render colors correctly.
- A demosaicing process to reconstruct a full color image from the incomplete color samples of input source image 120.
- Normalizing the intensity of all pixels in input source image 120 to the same level, using, e.g., an L1-Norm function or another similar function.

In some embodiments, in step 402, the instructions of image processing module 106*a* may cause system 100 to calculate and store a set of pixel values representing, for each pixel $P_{SRC}$ in input source image 120, at least pixel intensity and L1-norm values.

In some embodiments, in step 404, the instructions of spectral dataset module 106*b* may cause system 100 to determine the calibrated spectral response or sensitivity curve of the source device used to acquire the source image, as well as the spectral response or sensitivity curve of a target device in the target color space.

In some embodiments, the spectral response or sensitivity curve of the source and target devices may be determined based on technical specifications of the respective device, as may be provided by the device manufacturer. In some embodiments, the spectral response or sensitivity curve of the devices may be determined based on measuring the spectral response curve through a dedicated calibration system. For example, such calibration system may be configured to produce narrow band illumination (3-6 nm FWHM) to an integrating sphere, wherein the sphere may be imaged using the source device under testing, as well as an optical power meter. The calibration system allows to measure the percentage of photons collected by the source device under testing in each wavelength, which determines the device's quantum efficiency (QE).

In some embodiments, in step 406, the instructions of spectral dataset module 106*b* may cause system 100 to generate (i) a source reference set of spectral atoms termed $Atoms_{SRC}$ in the source color space, and (ii) a target reference set of spectral atoms termed $Atoms_{TRGT}$ in the target color space.

Figure 5A:
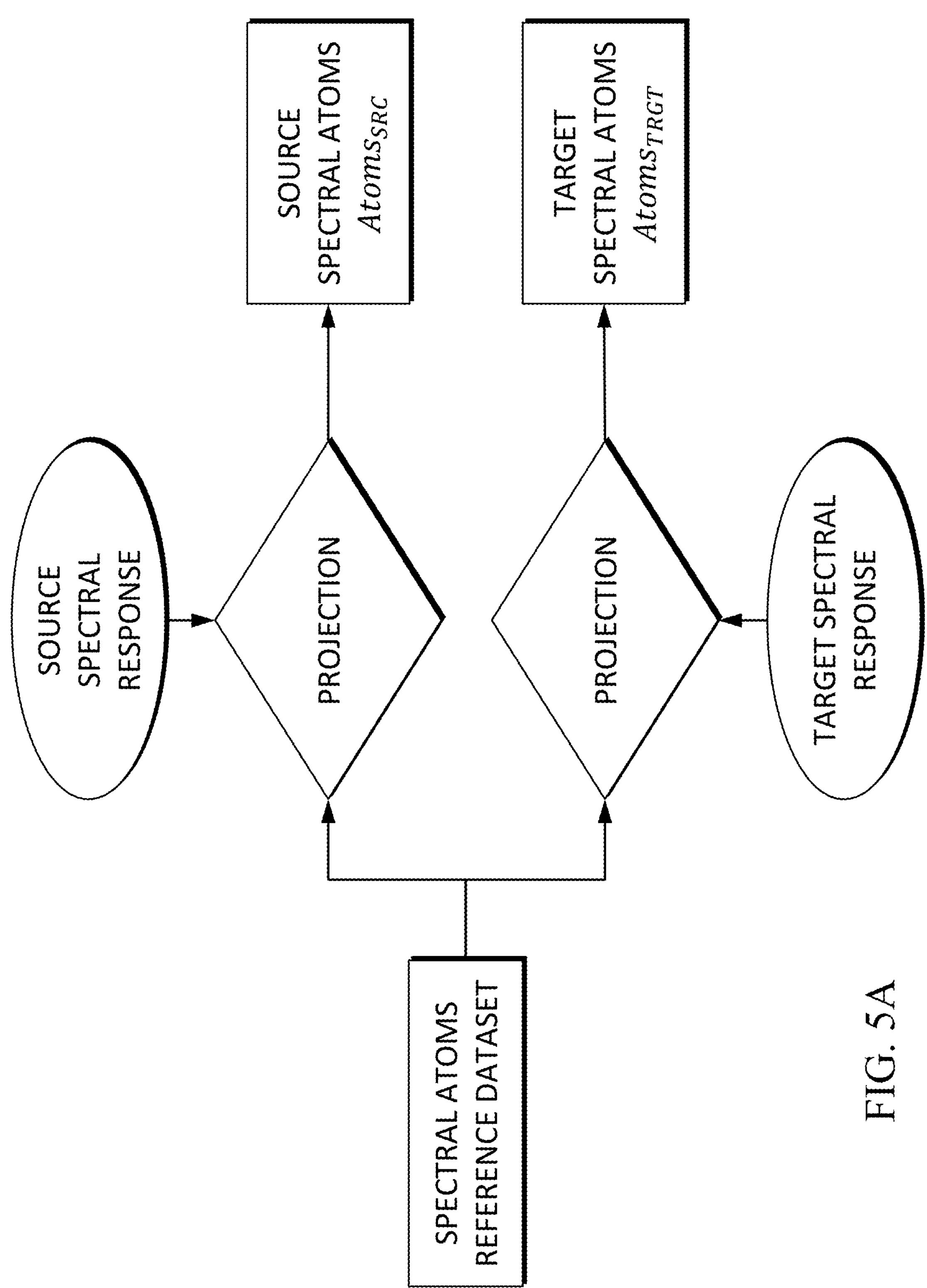
FIG. 5A schematically depicts the process of projecting the set of spectral atoms over the source and target color spaces, according to some embodiments of the present technique.

FIG. 5A schematically depicts the process of generating the set of spectral atoms over the source and target color spaces. In some embodiments the source reference set $Atoms_{SRC}$ is generated by projecting a provided spectral reference dataset, e.g., as may be generated using method 200 described with reference to FIG. 2, over the source spectral response curve. Thus, once the source device's spectral response is known, the source reference set of spectral atoms may be projected (e.g., using sum of spectral products) over the calibrated spectral response of the source device, to obtain the source reference set $Atoms_{SRC}$. Similarly, the reference set of spectral atoms, e.g., generated using method 200 detailed with reference to FIG. 2, may be projected over the target spectral response curve, e.g., the spectral perceptual response of an 'ideal observer,' to obtain a corresponding target reference set of spectral atoms in the target color space termed $Atoms_{TRGT}$.

Accordingly, in some embodiments, in step 406, the instructions of spectral dataset module 106*b* may cause system 100 to construct corresponding reference sets of source spectral atoms set $Atoms_{SRC}$ and their corresponding target spectral atoms set $Atoms_{TRGT}$. The source spectral atoms set $Atoms_{SRC}$ and their corresponding target spectral atoms set $Atoms_{TRGT}$ represent spectral responses within the respective color spaces.

In steps 408-414, the instructions of spectral conversion module 106*c* may cause system 100 to perform pixel-wise conversion of the source image into the target color space, using the corresponding source and target reference sets constructed in step 406.

Figure 5B:
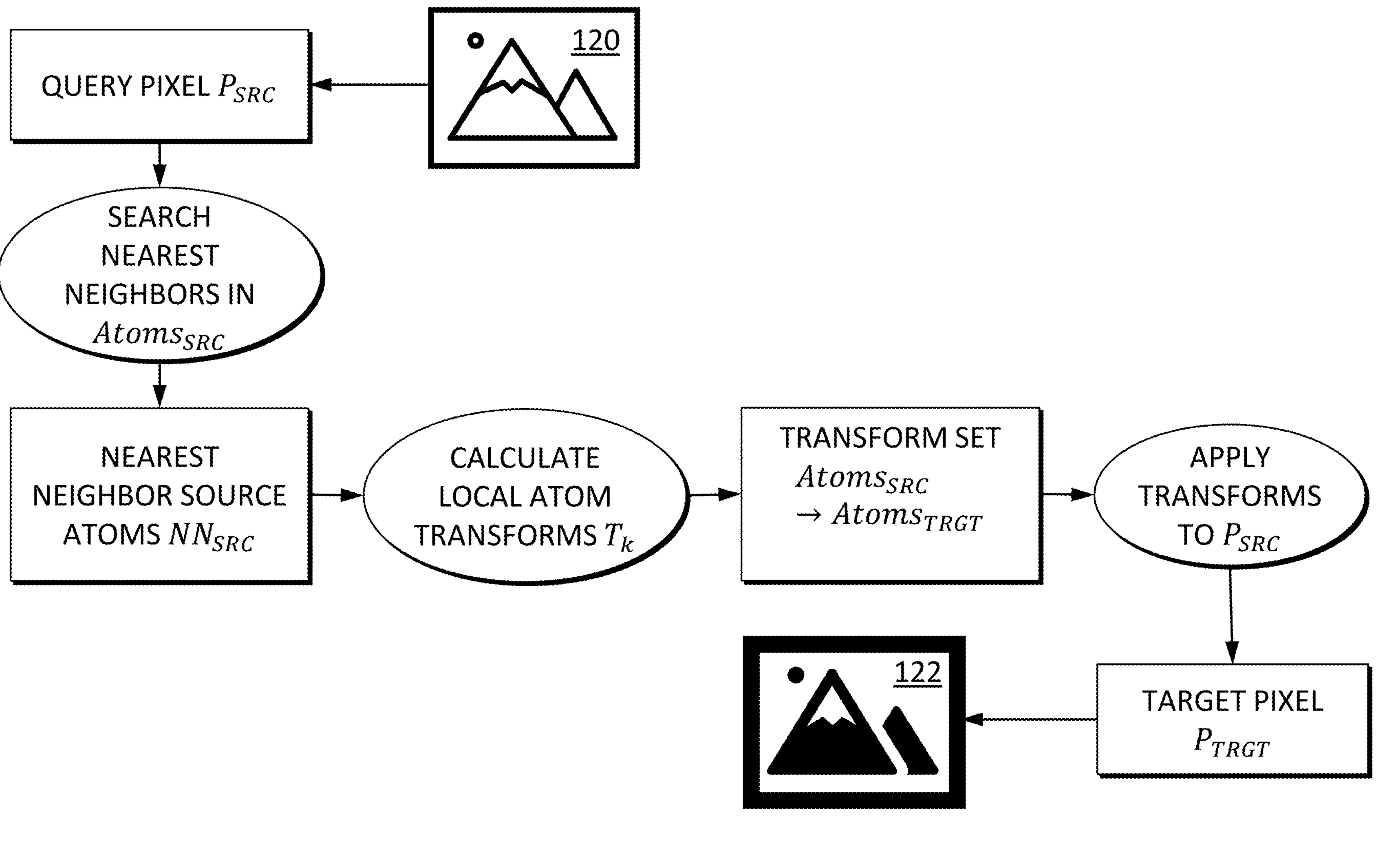
FIG. 5B shows a schematic overview of a process for performing pixel-wise conversion of a source image into a target color space, according to some embodiments of the present technique.

FIG. 5B shows a schematic overview of the process, which comprises the following steps:

- Locating pixel $P_{SRC}$ in the set of input source image 120 pixels $Pixels_{SRC}$ at its respective location within the source color space, based on at least its pixel intensity/amplitude and normalized pixel values (e.g., using L1-norm L1-Norm or L2-Norm function, or any other similar normalizing g function) as determined in step 402;
- conducting a search to identify the k nearest one or more source atom(s) $NN_{SRC}$ to query pixel $P_{SRC}$ within the source spectral atoms set $Atoms_{SRC}$ in the source color space;
- calculating a set of local transforms $T_k$ from each of the identified source atom(s) $NN_{SRC}$ to their corresponding target atom(s) $NN_{TRGT}$ in the target spectral atoms set $Atoms_{TRGT}$;
- applying the calculated transforms $T_k$ to the input source pixel $P_{SRC}$, to obtain a target pixel $P_{TRGT}$;
- repeating the above steps for all query pixels $P_{SRC}$ in $Pixels_{SRC}$, to obtain a corresponding set of target pixels $Pixels_{TRGT}$; and
- outputting a target image constructed based on all the obtained target pixels $Pixels_{TRGT}$.

Accordingly, in step 408, the instructions of spectral conversion module 106*c* may cause system 100 to position each query pixel $P_{SRC}$ within the set of input source image 120 pixels $Pixels_{SRC}$ at its respective location within the source color space, based on at least its pixel intensity/amplitude and L1-norm values as determined in step 402.

The instructions of spectral conversion module 106*c* may then cause system 100 to execute, with respect to each query pixel $P_{SRC}$, a search query to identify a set of one or more nearest source atoms $NN_{SRC}$ from source spectral atoms set $Atoms_{SRC}$, within the source color space. In some embodiments, the instructions of spectral conversion module 106*c* may cause system 100 to execute a search query to identify a set of k nearest source atoms $NN_{SRC}$ from source spectral atoms set $Atoms_{SRC}$.

In some embodiments, the search query may be executed using any suitable nearest neighbor search algorithm configured to find a point (or k points) within source spectral atoms set $Atoms_{SRC}$ that is closest or most similar to pixel $P_{SRC}$. In some embodiments, the search query may be executed using any suitable clustering algorithm configured to find a cluster with the nearest means within source spectral atoms set $Atoms_{SRC}$ to which pixel $P_{SRC}$ belongs.

In step 410, the instructions of spectral conversion module 106*c* may cause system 100 to calculate local transformation parameters $T_k$ for each of the k nearest source atoms $NN_{SRC}$ within source spectral atoms set $Atoms_{SRC}$ identified in step 408, wherein the local transforms define the reconstruction transformation from the vicinity of the atom in the source space to the target space. In some embodiments, the instructions of spectral conversion module 106*c* may cause system 100 to calculate a local transform $T_k$ from each of the set of k nearest source atoms $NN_{SRC}$ within source spectral atoms set $Atoms_{SRC}$ to a corresponding set of target atoms $NN_{TRGT}$ in target spectral atoms set $Atoms_{TRGT}$.

In some embodiments, the transforms $T_k$ are linear transforms which map values between two vector spaces, e.g., the source color space and the target color space. In some embodiments, other, non-linear transforms may be used.

Figure 5C:
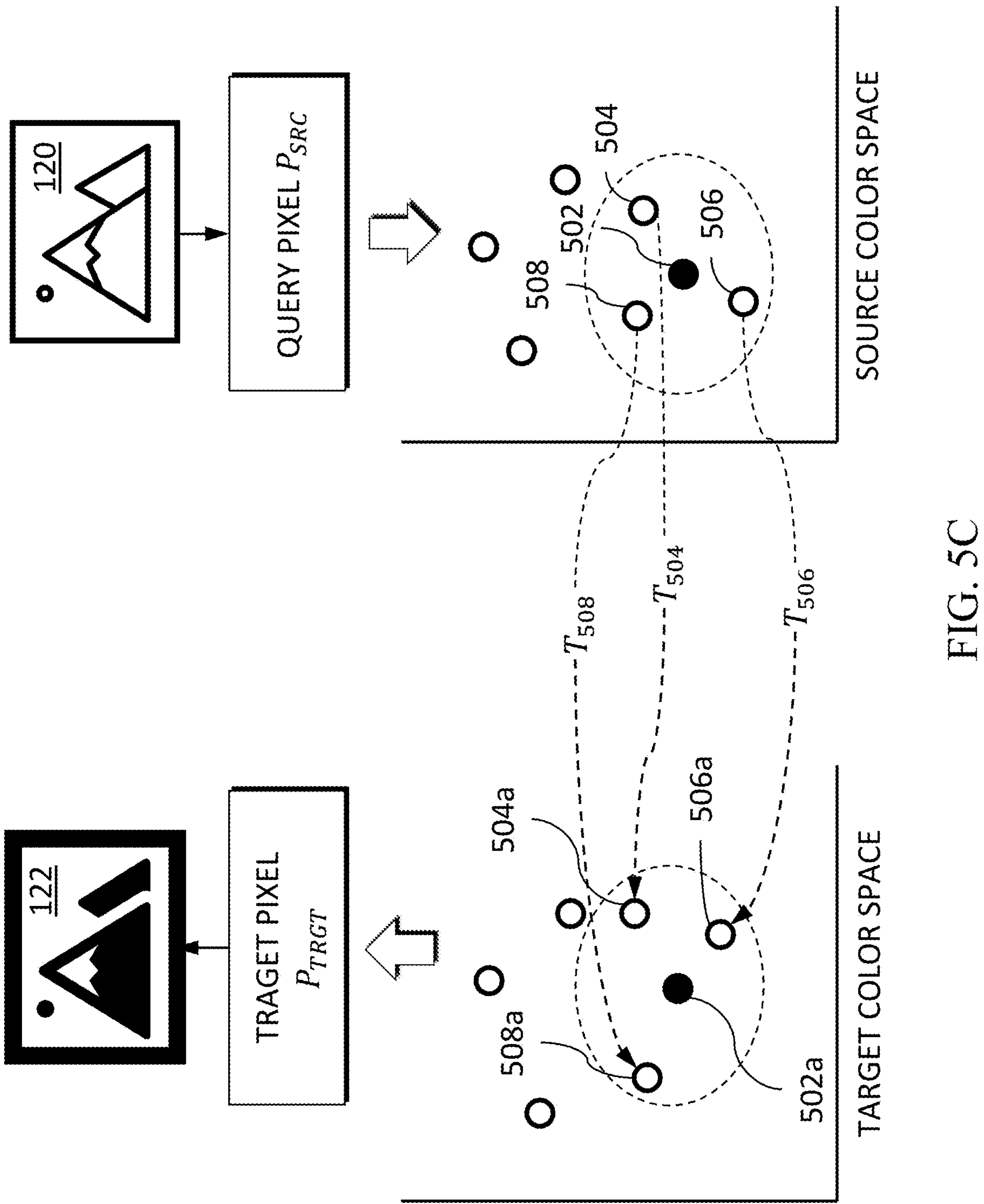
FIG. 5C schematically shows the calculation process for generating local transforms from a query point in the source color space to the corresponding point in the target color pace, according to some embodiments of the present technique.

FIG. 5C schematically shows the calculation process for generating local transforms from a query point in the source color space to the corresponding point in the target color pace. As can be seen, query pixel $P_{SRC}$ in the set of input source image 120 pixels $Pixels_{SRC}$ is located at its respective point 502 within the source color space, as described previously. A set of k nearest source atoms 504, 506, 508 is identified within the source color space with respect to query point 502, using any suitable nearest neighbor search algorithm as described previously. A set of local transforms $T_{504}$, $T_{506}$, $T_{508}$ is then calculated from source atoms 504, 506, 508 to corresponding target atoms 504*a*, 506*a*, 508*a*. the transforms $T_{504}$, $T_{506}$, $T_{508}$ are then applied the input query pixel, to obtain target point 502*a* in the target color space, which may be output as a target pixel $P_{TRGT}$. This process may repeat iteratively for all source pixels in in the set of input source image 120 pixels $Pixels_{SRC}$ to obtain a corresponding set of target pixels $Pixels_{TRGT}$. The instructions of spectral conversion module 106*c* may then cause system 100 to use the set of target pixels $Pixels_{TRGT}$ to reconstruct an output target image 122 in the target color space.

In some embodiments, in step 410, the instructions of spectral conversion module 106*c* may cause system 100 to calculate the set of transforms $T_k$ for each of the k nearest source atoms $NN_{SRC}$ within source spectral atoms set $Atoms_{SRC}$ identified in step 408, by applying a weighting to each sample by the inverse of its distance. Thus, when applying the transforms $T_k$, the present technique provides for interpolating from several of the nearest computed transformations. In some embodiments, this significantly decreases artifacts in the resulting target image. Accordingly, in some embodiments, for each query pixel $P_{SRC}$ in the set of source image 120 pixels $Pixels_{SRC}$, the instructions of spectral conversion module 106*c* may cause system 100 to:

- Find the nearest L neighbors of $P_{SRC}$ in in the set of source atoms $Atoms_{SRC}$, denoted $\{A_{SRC}\}$,
- find the distance $\{D_{SRC}\}$ between $P_{SRC}$ each of and $\{A_{SRC}\}$,
- calculate the set of transforms (or retrieve the set of transforms calculated and stored in advance) for all $\{A_{SRC}\}$, denoted $\{T_{SRC}\}$,
- calculate a weighting scheme for each transform $$\{W_{SRC}\} = \left\{\frac{1}{D_{SRC}}\right\},$$

and

- calculate a weighted transform $$\text{Transform} = \frac{\text{sum}(\{W_{SRC} * T_{SRC}\})}{K},$$

where K is a normalization coefficient.

In some embodiments, an optimized process may be performed with respect to steps 408-410, which does away with the need to conduct a nearest neighbor search and calculate transforms on the fly during runtime.

Accordingly, the instructions of spectral conversion module 106*c* may cause system 100 to identify in advance, for each potential query point in the source space, the k nearest source atoms $NN_{SRC}$ within source spectral atoms set $Atoms_{SRC}$. Then, the instructions of spectral conversion module 106*c* may cause system 100 to calculate and store the set of local transforms $T_k$ from the identified source atoms $NN_{SRC}$ to the corresponding target atoms $NN_{TRGT}$ for each such potential query point.

Then, during runtime, for each query pixel $P_{SRC}$ in the set of input source image 120 pixels $Pixels_{SRC}$, the instructions of spectral conversion module 106*c* may cause system 100 to associate the query pixel $P_{SRC}$ with a one of the potential query points in the source color space, and to call the relevant set of transforms TR from the dedicated repository.

With reference back to FIG. 4, in step 412, the instructions of spectral conversion module 106*c* may cause system 100 to apply the set of transforms $T_k$ calculated with respect to the $NN_{SRC}$ nearest neighbor source atoms to the input source pixel $P_{SRC}$, to obtain a corresponding target pixel $P_{TRGT}$ in the target color space.

In some embodiments, the instructions of spectral conversion module 106*c* may cause system 100 to apply a weighted transform calculated as detailed above in step 410, to obtain $P_{TRGT}$.

In some embodiments, the instructions of spectral conversion module 106*c* may cause system 100 to call the relevant set of transforms $T_k$ calculated in advance with respect to the source color position associated with query pixel $P_{SRC}$ from the dedicated repository, and to apply the recalled set of transforms $T_k$ to query pixel $P_{SRC}$ to obtain the corresponding $P_{TRGT}$ in the target color space.

In some embodiments, the instructions of spectral conversion module 106*c* may cause system 100 to repeat steps 408-412 for all query pixels $P_{SRC}$ in source image 120 set of pixels $Pixels_{SRC}$, to obtain a corresponding set of target pixels $Pixels_{TRGT}$.

In some embodiments, in step 414, the instructions of spectral conversion module 106*c* may cause system 100 to use the set of target pixels $Pixels_{TRGT}$, to reconstruct an output target image 122 in the target color space. In some examples, the instructions of spectral conversion module 106*c* may cause system 100 to use the set of target pixels $Pixels_{TRGT}$ to render the target image 122 on a target display device, such as a computer monitor, smartphone display, etc.

In some embodiments, potential applications of the present technique may include:

- Hyperspectral Sensing: recovered hyperspectral data can be used directly for a variety of applications, such as material analysis, medical diagnosis, and agricultural applications, wherein spectral signatures can be used to differentiate between images objects that would appear identical in non-hyperspectral imaging.
- RGB or Multispectral Camera Simulation: the spectral atom spectral reference dataset of the present technique allows generating images in any color space from a source image, agnostically of the filter set used to acquire the source image.
- Increased Photon Efficiency: As noted above, conventional RGB filters have the drawback of reducing sensor light sensitivity by approximately 66%. The present technique can produce accurate RGB or other color space images from source image obtained using a higher-efficiency filter array.
- Illumination Correction: Despite years of research, illumination correction (or "white balance") in consumer cameras remains on open problem. Current generation cameras often fail in matching the human-level color constancy, especially in challenging lighting conditions. Using the present technique, illumination estimation and correction may be performed in hyperspectral space. The resulting corrected information may be used to produce RGB images.

The present invention may be a computer system, a computer-implemented method, and/or a computer program product. The computer program product may include a computer readable storage medium (or media) having computer readable program instructions thereon for causing a hardware processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:

at least one hardware processor; and a non-transitory computer-readable storage medium having stored thereon program instructions, the program instructions executable by the at least one hardware processor to:

receive a set of spectral datapoints obtained from a plurality of images of natural scenes, wherein the images are captured using a hyperspectral imaging device, perform data sampling to obtain a subset of said set of spectral datapoints that is representative of naturally-occurring spectral samples, project said subset of datapoints over (i) a known spectral response profile of a source color space, and (ii) a known spectral response profile of a target color space, to obtain corresponding datasets of source spectral reference atoms and target spectral reference atoms, and for each point in said source color space: (a) identify the k nearest atoms in said dataset of source spectral reference atoms; and (b) calculate and store a transform associated with said point from said k nearest atoms in said dataset of source spectral reference atoms to a set of corresponding k atoms in said dataset of target spectral reference atoms.

2. The system of claim 1, wherein said program instructions are further executable to receive a digital image in said source color space and, iteratively:
(i) with respect to a first pixel in said digital image, locate a point which represents said pixel within said source color space;
(ii) recall said stored transform calculated with respect to said located point in said source color space;
(iii) apply said recalled transform to said pixel, to obtain a target pixel in said target color space;
(iv) repeat steps (i)-(iii) with respect to a next pixel in said digital image; and
construct a target image in said target color space from all of said obtained target pixels in said target color space.

3. The system of claim 1, wherein said transform is a linear transform which maps values between said source color space and said target color space.

4. The system of claim 1, wherein said transform is calculated as a weighted interpolation, by applying a weighting to each of said k nearest atoms in said dataset of source spectral reference atoms, and wherein said weighting is the inverse of the distance of each of said k nearest atoms to said point in said source color space representing said pixel.

5. The system of claim 1, wherein said source color space is cyan-yellow-magenta (CYM), and said target color space is red-green-blue (RGB).

6. The system of claim 1, wherein said natural scenes comprise one or more of: indoors scenes, outdoors scenes, cityscape scenes, countryside scenes, landscape scenes, landforms scenes, terrain scenes, wildlife scenes, vegetation scenes, and objects scenes.

7. A computer-implemented method comprising:
receiving a set of spectral datapoints obtained from a plurality of images of natural scenes, wherein the images are captured using a hyperspectral imaging device;
performing data sampling to obtain a subset of said set of spectral datapoints that is representative of naturally-occurring spectral samples;
projecting said subset of datapoints over (i) a known spectral response profile of a source color space, and (ii) a known spectral response profile of a target color space, to obtain corresponding datasets of source spectral reference atoms and target spectral reference atoms; and
for each point in said source color space: (a) identifying the k nearest atoms in said dataset of source spectral reference atoms; and (b) calculating and storing a transform associated with said point from said k nearest atoms in said dataset of source spectral reference atoms to a set of corresponding k atoms in said dataset of target spectral reference atoms.

8. The computer-implemented method of claim 7, further comprising receiving a digital image in said source color space and, iteratively:
(i) with respect to a first pixel in said digital image, locating a point which represents said pixel within said source color space;
(ii) recalling said stored transform calculated with respect to said located point in said source color space;
(iii) applying said recalled transform to said pixel, to obtain a target pixel in said target color space;
(iv) repeating steps (i)-(iii) with respect to a next pixel in said digital image; and
constructing a target image in said target color space from all of said obtained target pixels in said target color space.

9. The computer-implemented method of claim 7, wherein said transform is a linear transform which maps values between said source color space and said target color space.

10. The computer-implemented method of claim 7, wherein said transform is calculated as a weighted interpolation, by applying a weighting to each of said k nearest atoms in said dataset of source spectral reference atoms, and wherein said weighting is the inverse of the distance of each of said k nearest atoms to said point in said source color space.

11. The computer-implemented method of claim 7, wherein said source color space is cyan-yellow-magenta (CYM), and said target color space is red-green-blue (RGB).

12. The computer-implemented method of claim 7, wherein said natural scenes comprise one or more of indoors scenes, outdoors scenes, cityscape scenes, countryside scenes, landscape scenes, landforms scenes, terrain scenes, wildlife scenes, vegetation scenes, and objects scenes.

13. A computer program product comprising a non-transitory computer-readable storage medium having program instructions embodied therewith, the program instructions executable by at least one hardware processor to:
receive a set of spectral datapoints obtained from a plurality of images of natural scenes, wherein the images are captured using a hyperspectral imaging device;
perform data sampling to obtain a subset of said set of spectral datapoints that is representative of naturally-occurring spectral samples;
project said subset of datapoints over (i) a known spectral response profile of a source color space, and (ii) a known spectral response profile of a target color space, to obtain corresponding datasets of source spectral reference atoms and target spectral reference atoms; and
for each point in said source color space: (a) identify the k nearest atoms in said dataset of source spectral reference atoms; and (b) calculate and store a transform associated with said point from said k nearest atoms in said dataset of source spectral reference atoms to a set of corresponding k atoms in said dataset of target spectral reference atoms.

14. The computer program product of claim 13, wherein said program instructions are further executable to receive a digital image in said source color space and, iteratively:
(i) with respect to a first pixel in said digital image, locate a point which represents said pixel within said source color space;
(ii) recall said stored transform calculated with respect to said located point in said source color space;
(iii) apply said recalled transform to said pixel, to obtain a target pixel in said target color space;
(iv) repeat steps (i)-(iii) with respect to a next pixel in said digital image; and
construct a target image in said target color space from all of said obtained target pixels in said target color space.

* * * * *